United States Patent [19]
Monro

[11] Patent Number: 5,044,424
[45] Date of Patent: * Sep. 3, 1991

[54] HEAT GENERATOR

[76] Inventor: Richard J. Monro, 102 Ramapoo Rd., Ridgefield, Conn. 06877

[ * ] Notice: The portion of the term of this patent subsequent to Apr. 24, 2001 has been disclaimed.

[21] Appl. No.: 440,852

[22] Filed: Nov. 22, 1989

Related U.S. Application Data

[60] Division of Ser. No. 906,524, Sep. 12, 1986, Pat. No. 4,903,756, which is a continuation-in-part of Ser. No. 749,000, Jun. 26, 1985, abandoned, which is a continuation-in-part of Ser. No. 578,378, Feb. 8, 1984, abandoned, which is a continuation-in-part of Ser. No. 385,051, Jun. 4, 1982, Pat. No. 4,444,128, which is a continuation of Ser. No. 218,355, Dec. 19, 1980, abandoned, which is a continuation of Ser. No. 26,028, Apr. 2, 1979, abandoned.

[51] Int. Cl.⁵ .................... F28D 19/04; F28G 9/00
[52] U.S. Cl. .......................... 165/5; 165/7; 165/10; 165/913
[58] Field of Search .................... 165/5, 7, 10, 913

[56] References Cited

U.S. PATENT DOCUMENTS

| | | | |
|---|---|---|---|
| 3,203,472 | 8/1965 | Brandt | 165/913 |
| 3,252,505 | 5/1966 | Huebner, Jr. | 165/7 |
| 3,773,105 | 11/1973 | Kondo | 165/9 |
| 3,969,482 | 7/1976 | Teller | 423/244 |
| 3,989,798 | 11/1976 | Greene et al. | 423/244 |
| 4,202,660 | 5/1980 | Pei | 165/10 |
| 4,208,383 | 6/1980 | Kisters et al. | 423/234 |
| 4,228,847 | 10/1980 | Lindahl | 165/10 |
| 4,278,645 | 7/1981 | Filss | 423/234 |
| 4,444,128 | 4/1984 | Monro | 110/345 |
| 4,676,299 | 6/1987 | Johnson | 165/7 |
| 4,705,101 | 11/1987 | Warner | 165/913 |

FOREIGN PATENT DOCUMENTS

| | | | |
|---|---|---|---|
| 14445 | 9/1978 | Japan | 165/5 |
| 119458 | 10/1978 | Japan | 165/5 |
| 134860 | 10/1979 | Japan | 165/5 |

Primary Examiner—Albert W. Davis, Jr.
Attorney, Agent, or Firm—St. Onge Steward Johnston & Reens

[57] ABSTRACT

A method and apparatus for improving the efficiency of the thermal section of a large scale power plant heat generator in which combustible fuels such as fossil fuels, refuse or other materials are burned are described. Flue gas generated in the heat generators and combustion air are passed in heat exchanger relationship at diametrically opposite sides of a rotary type air preheater. The heat exchanger relationship is selected so that it causes removal of a substantial amount of heat from the flue gas whose temperature is consequently lowered to a level where a corrosive pollutant such as $SO_3$ in the form $H_2SO_4$ condenses out. During operation the rotor is rotated at a slow speed while a strong localized stream of wash liquid is applied onto a portion of the rotor in the air preheater along a zone selected to enable a drain down of wash liquid before the wetted portion reenters the air flow side. A netralizer liquid is applied in such a manner that a dry barrier layer is formed over the heat exchanger surfaces to protect these against corrosive effects from condensed pollutants for long time periods. Preferred ranges of operating parameters are described to achieve high fuel savings. These parameters include rotor speed, heat capacities of the air flow, the rotor and the washing liquid.

66 Claims, 6 Drawing Sheets

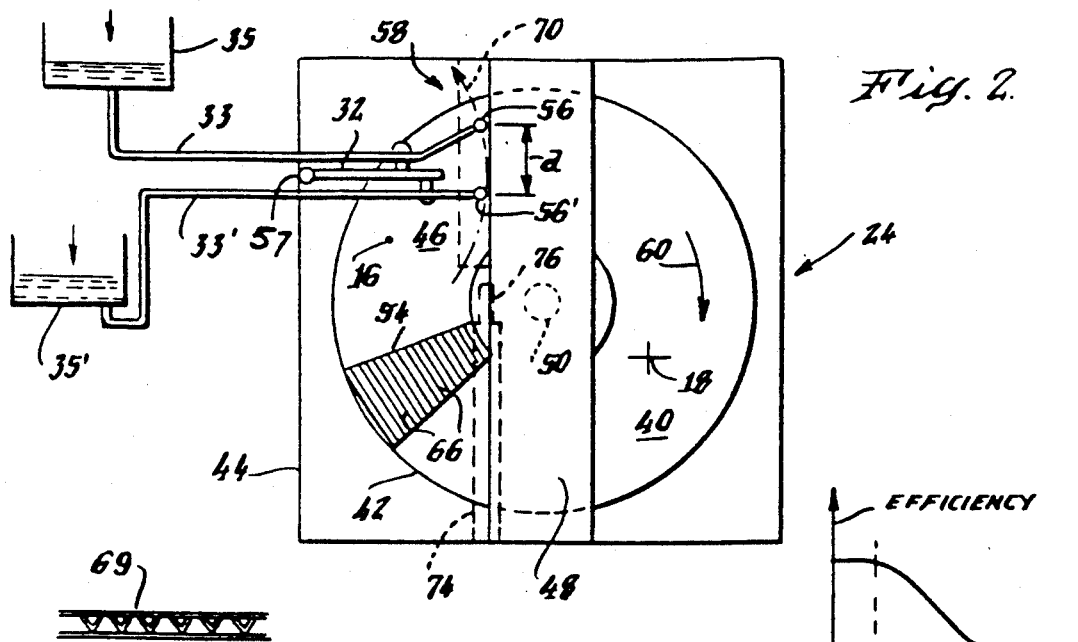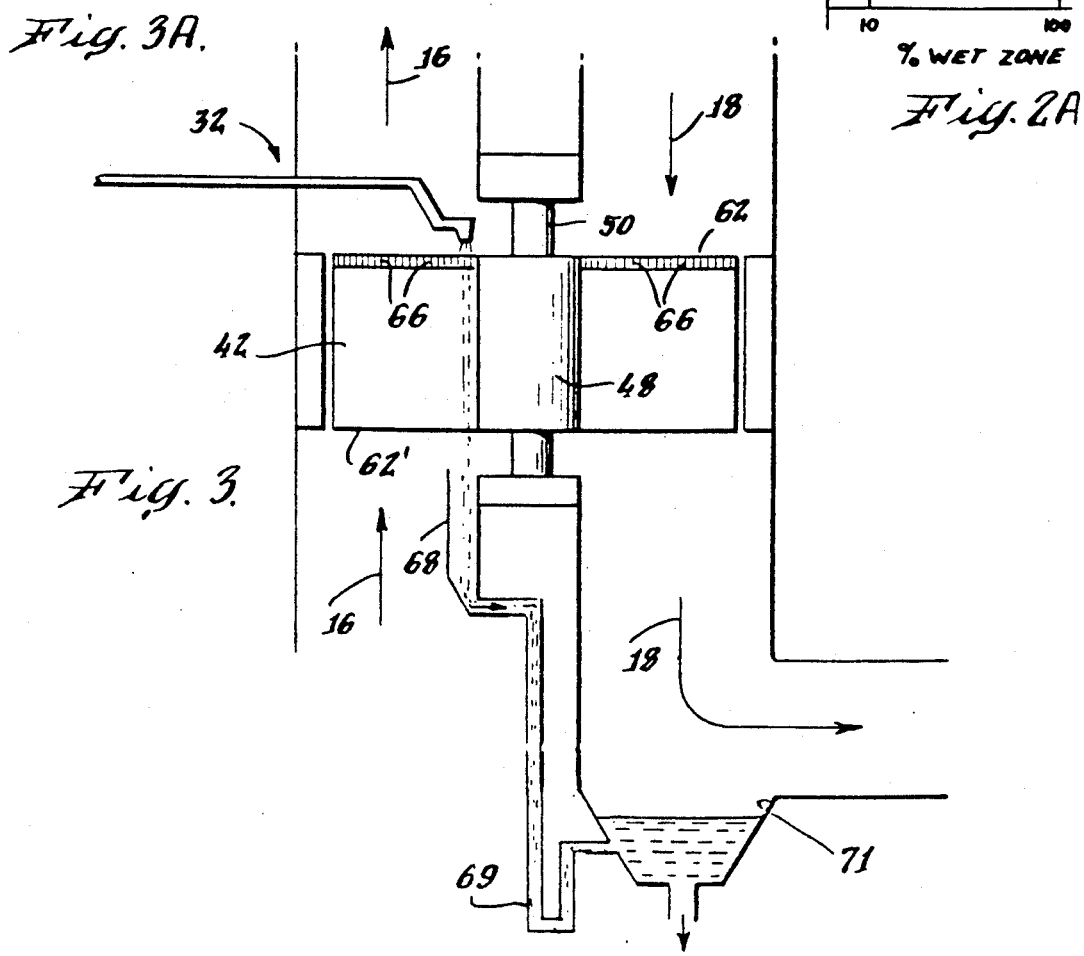

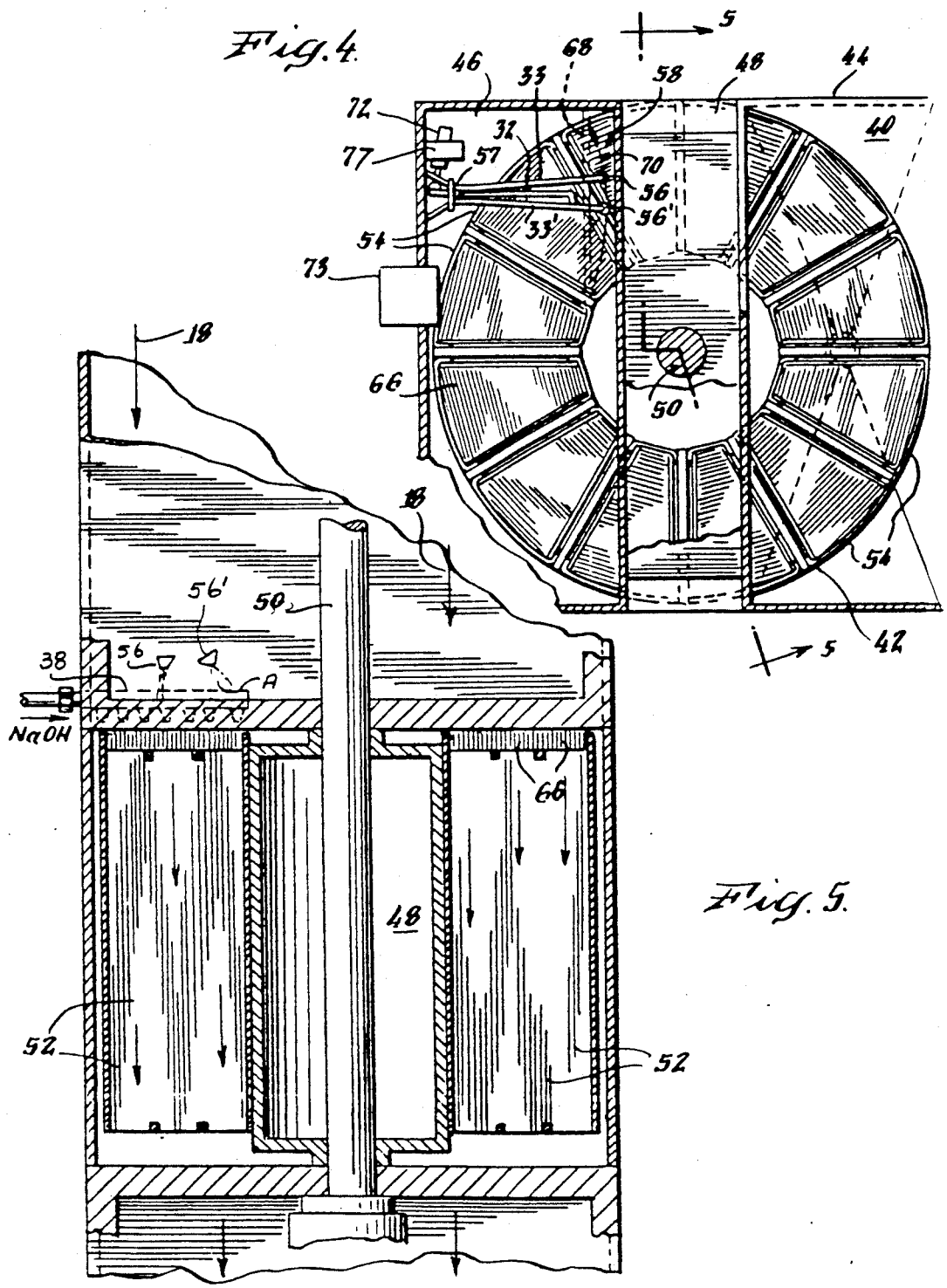

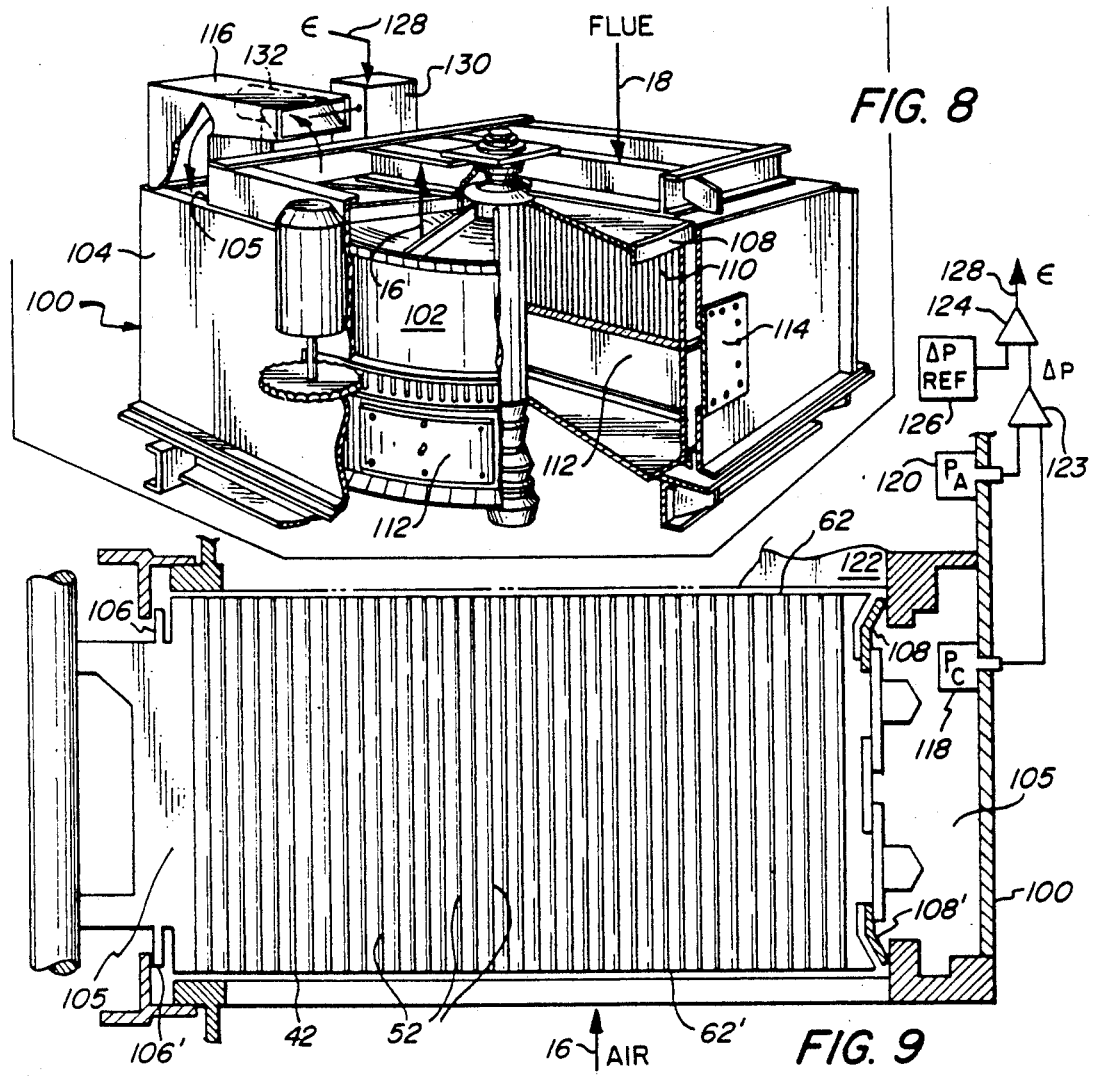
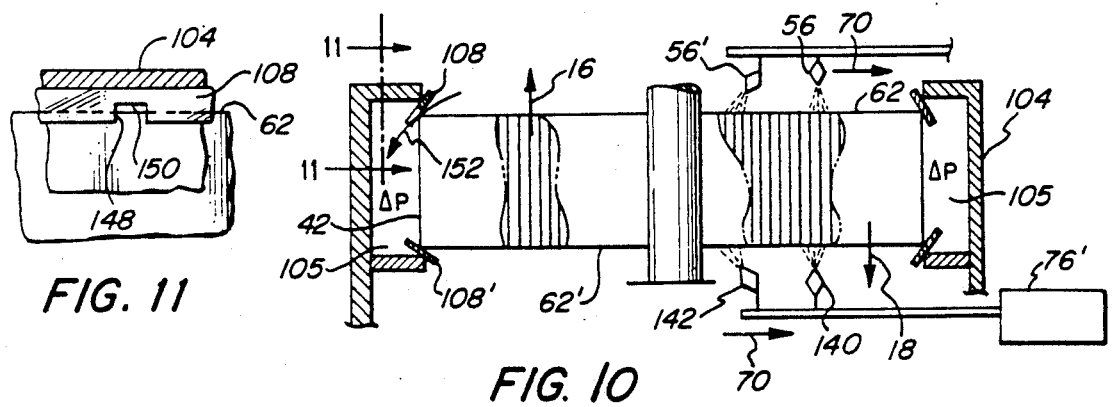

HEAT GENERATOR

PRIOR APPLICATION

This is a divisional of copending application Ser. No. 06/906,524, filed on Sept. 12, 1896, now U.S. Pat. No. 4,903,756, granted Feb. 29, 1990, which was a continuation in part of U.S. patent application Ser. No. 749,000 filed June 26, 1985, now abandoned; and which was a continuation in part of U.S. patent application Ser. No. 578,378 filed Feb. 8, 1984, now abandoned; and which is a continuation in part of U.S. patent application Ser. No. 385,051, filed June 4, 1982, now U.S. Pat. No. 4,444,128; which is a continuation of U.S. patent application Ser. No. 218,355 filed Dec. 19, 1980, now abandoned; which was a continuation of U.S. patent application Ser. No. 26,028 filed Apr. 2, 1979, now abandoned.

FIELD OF THE INVENTION

This invention relates to heat generators in which combustible fuels such as fossil fuels, refuse or other materials are burned. More specifically, this invention relates to a method and system for improving the efficiency of such heat generators and particularly for better utilization of heat produced in the thermal section for a large electric power plant using a combustible fuel.

BACKGROUND OF THE INVENTION

In a copending patent application entitled "Improved Heat Generator," Ser. No. 385,051 filed June 4, 1982 which is a continuation in part of U.S. patent application Ser. No. 218,355 filed Dec. 19, 1980 and which latter application was published in International Publication W083/01827 by Richard J. Monro, a technique is described for improving the efficiency of a heat generator in which an inflow of combustion air is preheated by the exhausting flue gas. An air preheater of the rotary type is described which is operated with such a heat exchange relationship that sufficient heat in the flue gas is transferred to the combustion air that a gaseous pollutant condenses out in the preheater. A liquid is simultaneously applied to the heat exchanger so that a pollutant such as $SO_3$ and its condensed form of $H_2SO_4$ are washed away. A neutralizing liquid may be used.

PRIOR ART BACKGROUND

Heat generators using combustible fuels such as oil, coal, gas or refuse materials and the like, generate a substantial quantity of waste materials in the form of pollutant gases and particulates. Federal and state environmental requirements have imposed maximum emission standards for these waste materials. Compliance with these emission standards involves substantial investments for appropriate pollution control equipment, the costs for which can be prohibitively high.

For example, large systems are available to remove particulates using a dry flue gas treatment. Typical devices used for this purpose may involve electrostatic precipitators, bag houses and the like. These devices are suitable for the removal of the particulates, but gaseous pollutants are not removed and as can be appreciated, the addition of these devices increases cost and reduces the efficiency of the heat generator.

The magnitude of gaseous pollutants generated from the combustion of fuel throughout the world is enormous. As a result, many techniques have been described for the removal of these pollutants from flue gases exhausted from heat generators. A general statement of various wet scrubbing processes for pollutant removal from flue gases exhausted from large scale electric power plants can be found in a chapter entitled "Wet Scrubbing Process—$SO_x$ and $No_x$ Removal Chemistry" by R.G. Nevill, at pages 9-312 of "Energy Technology Handbook" edited by D.M. Considine and published by McGraw-Hill Book Company.

Flue gas wet scrubbing techniques also involve substantial investments with complex systems. For example, in the Domahidy U.S. Pat. No. 3,320,906 and Huntington U.S. Pat. No. 3,733,777, wet scrubbers are described in which flue gases are passed through a filter bed for intimate contact with a wash liquid. The wash liquid may be an aqueous bisulfite salt solution such as described in the Huntington patent or such alkaline scrubbing liquors indicated as useful with the wet scrubber described in Teller U.S. Pat. No. 4,049,399.

Since corrosive liquid droplets are likely to be entrained by the scrubbed flue gas, special techniques such as described by Teller or in the Brandt U.S. Pat. No. 3,844,740 may be used to avoid corrosion on subsequent equipment such as an induced draft fan located at the stack where the flue gas is exhausted to atmosphere.

Another technique for the removal of pollutants may involve cooling of the flue gas to such low temperatures that gaseous pollutants such as $SO_2$ and $SO_3$ condense out. One such system is described in the Maniya U.S. Pat. No. 3,839,948, in which the flue gas is cooled to about 10° C. to condense out the sulfurous pollutants after which the flue gas is reheated before discharge to atmosphere.

These and other techniques for the removal of waste materials from flue gas involve a substantial amount of energy, much of which is irretrievably lost. As a result, the overall efficiency, i.e., the energy available for sale from a power plant is significantly reduced.

Techniques for preheating of air have been known and used for many years in connection with boilers to improve combustion. One such preheating technique employs a Ljungstrom air preheater. This uses a rotor through which on one side flue gas is passed while an inflow of combustion air is passed through the other side, with the two gas flows being in opposite directions. Air preheaters, however, are operated at sufficiently high temperatures to avoid condensation inside the heat exchanger of pollutants such as $SO_3$ present in the flue gas.

For example, in typical published temperature guide lines for Ljungstrom air preheaters, the outlet flue gas temperature is maintained at least at 350° F. At this temperature, gaseous $SO_3$ does not condense and corrosive effects on the preheater are minimized.

Techniques for cleaning rotary heat exchangers have been described in the art. For example, the Schoenherr et al U.S. Pat. No. 2,812,923 describes such an apparatus which applies a cleaning liquid through ports in a sector plate above the heat exchanger and withdraws the liquid through slots in a sector plate located below the heat exchanger.

SUMMARY OF THE INVENTION

With a system and method in accordance with the invention, improvements in the operation of a rotary air preheater as described in the aforementioned copending patent application are obtained whereby significant fuel savings are achieved.

With reference to one system and method for operating a rotary preheater in accordance with the invention, the washing liquid is applied to the rotary preheater in such manner in conjunction with the rotational speed of the rotor of the preheater that the carry-over of liquid into the air flow side of the preheater is substantially reduced and the wetting of the preheater is controlled to a low level selected to attain a high fuel saving. This involves a slow rotational speed of the rotor used in the rotary heat exchanger and the application of liquid in a strong localized stream so as to wet a limited portion of the air preheater at any one time. The stream is moved along a zone located at the hot axial end of the heat exchanger where air exits and flue gas enters and in the vicinity of the region where the rotor leaves the air flow side to enter the flue gas side.

The thermal efficiency of conventional rotary air preheaters generally increases with rotational speed with a maximum speed for large scale electricity generating stations being of the order of about four revolutions per minute (rpm). In a system and method in accordance with the invention, high rotational speeds have been found to reduce efficiency and a low speed is used to yield desired net fuel savings. The rotor speed is, therefore, selected commensurate with the time needed for liquid to drain through the heat exchanger prior to the re-entry of wetted heat exchange elements into the combustion air side. The rotor speed generally is less than one rpm and preferably of the order of a quarter of an rpm.

The mass flow of the air through the preheater preferably is selected sufficiently high relative to the heat capacity of the rotary air preheater to overcome degradation effects due to the application of liquor to remove particulates and the acid pollutants condensed out in the preheater. The liquid flow preferably is selected at the lowest level which is consistent with corrosion protection and wheel cleaning capability.

With these considerations a wide range of operating conditions can be set depending upon an acceptable level of fuel savings with the invention. For high fuel savings the rotary preheater should be sized so that the ratio of the heat capacity of the air $H_a$ to the heat capacity of the rotor, $H_r$, is greater than a predetermined value while the ratio of the heat capacity of the air $H_a$ to that of the liquid, $H_L$, should also be greater than a preselected value.

As described herein with reference to one method for operating a thermal section in accordance with the invention, a neutralizing liquid containing a high level of alkaline material is applied to previously liquid cleaned rotor parts that are preferably essentially dry. The neutralizing liquid contains a sufficient amount of alkaline material, such as NaOH, so that as this dries, a thin dry layer is formed over the surfaces of the heat exchanger elements of the rotor. Condensed sulfuric acid tends to preferentially react with this layer instead of the base metal during operation to form a neutralized salt layer. With this technique, protection of the rotary heat exchanger against acid attack can be significantly extended over long time periods. This in turn advantageously enables a reduction of the amount of liquid cleaning needed of the rotor.

As described herein, protection of the air preheater against corrosion from condensed $H_2SO_4$ is enhanced by orienting the neutralizing stream of liquid in a preferred direction with respect to the preheater media plates so as to assure neutralizer liquid impact on their surfaces. Additional corrosion protection is obtained by establishing a small pressure in the plenum of the preheater surrounding its rotor. This reduces the escape of corrosive $SO_3$ and condensed $H_2SO_4$ past the rotor seals into the plenum. Corrosion protection is further enhanced with an application of the wash or neutralizing liquids or both from the cold end or flue gas exit side of the preheater.

It is, therefore, an object of the invention to improve the thermal efficiency of a heat generator using combustible fuels. It is another object of the invention to obtain such efficiency improvement while removing a pollutant in the flue gas from the heat generator and cleaning an air preheater used to achieve the efficiency improvement. It is a further object of the invention to protect a rotary air preheater against attack from an acid condensed out from the extraction of heat from a flue gas by neutralizing the condensed acid, washing away salts and ash while maintaining a heat transfer from the flue gas to the combustion air, and do all this at relatively low costs in comparison with the fuel saving benefits obtained.

These and other advantages and objects of the invention can be understood from the following detailed description of an embodiment in accordance with the invention and described with reference to the drawings.

BRIEF DESCRIPTION OF DRAWINGS

FIG. 2 is a schematic plan view of an air preheater employed in accordance with the invention;

FIG. 2A is a heat exchange efficiency plot of a rotary air preheater as a function of the percentage of its wetter surfaces;

FIG. 3 is a schematic vertical sectional view of the air preheater shown in FIG. 2;

FIG. 3A is a partial sectional view of a notched flat media plate used in a rotary air preheater used in accordance with the invention;

FIG. 4 is a broken-away top plan view of a rotary air preheater in accordance with the invention;

FIG. 5 is a vertical section view of the air preheater as shown in FIG. 4 and is taken along the line 5—5 in FIG. 4;

FIG. 8 is a perspective view of a conventional rotary air preheater that has been modified in accordance with the invention;

FIG. 9 is a partial vertical sectional and schematic view of the air flow side of a rotary air preheater modified in accordance with the invention; and FIG. 10 is a schematic vertical section view of the air flow side on the left and the flue gas side on the right of a modified rotary air preheater and wash assembly in accordance with the invention; FIG. 11 is a partial side section view of an apertured upper and radially outer seal taken along the line 11—11 in FIG. 10.

DETAILED DESCRIPTION OF DRAWINGS

Figure 1:
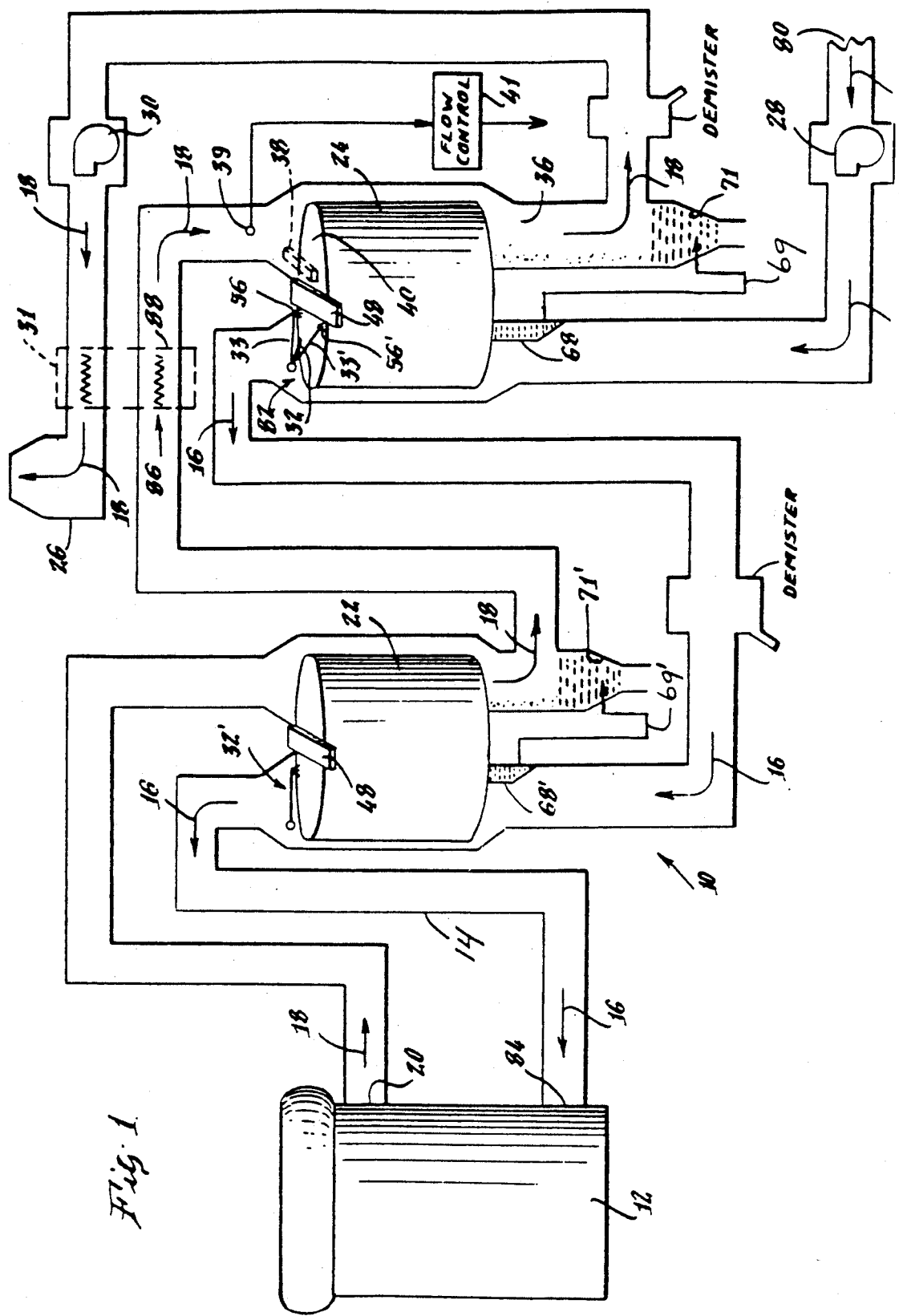
FIG. 1 is a schematic perspective representation of one heat generator employing air preheaters in accordance with the invention.

With reference to FIG. 1, the thermal section 10 of a conventional power plant is shown with a boiler 12 in which a suitable fuel such as fossil fuel in the form of coal, oil or gas or other fuel such as a waste material is burned. An inflow of combustion air is provided, as suggested by arrows 16, through suitable ducts 14 into the boiler 12.

The boiler 12 includes suitable heat exchange elements (not shown) in which a working fluid (water or steam) is circulated for heating by the combustion gases generated in the boiler 12. Flue gas, as suggested by arrows 18, emerges at a discharge 20 from the boiler 12 at a high temperature, typically in the range of about 650° F., and is passed through first and second rotary heat exchangers 22, 24 to preheat the inflow of air 16. Although two air preheaters are shown, a single suitably sized unit could be used. After passage through heat exchangers 22, 24 the flue gas 18 is discharged to atmosphere at a stack 26 after passage through a reheater 31. Air flow through the thermal section 10 is obtained with a forced draft fan 28 and an induced draft fan 30. An air reheater 31 may be used to raise the temperature of the flue gas at the stack for plume suppression.

The flue gas 18 may include pollutant materials in the form of particulates such as fly ash and gases such as $SO_2$, $SO_3$ and others. Techniques for removal of the pollutants are usually a part of the thermal section 10, though for purposes of simplicity of FIG. 1, these pollution controls have been left out of the schematic representation. Suffice it to say that techniques and devices for collecting particulates and pollutant gases from flue gases have been extensively described in the art.

It is generally recognized that, particularly in large electric power plants, the exhaust temperature of the flue gas should preferably be kept above the dew point of the acid $H_2SO_4$ to avoid corrosive effects from contact by condensed $H_2SO_4$ with equipment such as the air preheaters 22, 24 and the induced draft fan 30 as well as the emission of corrosive particles from stack 26. Hence, the amount of heat recaptured from the flue gas is usually limited to maintain the flue gas temperature above the acid ($H_2SO_4$) dew point, i.e., the flue gas is kept above about 300° F. to 350° F. As a result, the temperature of the inflow of air 16 at the boiler 12 is usually about 450° F. and the thermal efficiency of thermal section 10 in conventional systems is not as high as it could theoretically be made.

As described in the aforementioned copending patent application, a substantially greater amount of heat from flue gas is recaptured to achieve a higher thermal efficiency. This is advantageously simultaneously accompanied by the extraction of pollutants and cleaning of the preheater. The recapture of heat is achieved by passing the flue gas 18, after its passage through preheater 22, through rotary heat exchanger 24 where an additional portion of the heat in the flue gas 18 is extracted for transfer to the inflow of air 16.

The rotary heat exchanger 24 operates with a working liquid, such as water, which is applied through a conduit 33 mounted to a wash arm 32 from a pressurized supply 35 (shown in FIG. 2) into the heat exchanger. The liquid is applied in a strong localized stream to dislodge particulates adhering to heat exchange elements while also washing away corrosive constituents such as condensed $H_2SO_4$ as well as salts formed by condensed $H_2SO_4$ with previously deposited alkaline neutralizing materials. Although the wash liquid could contain all of the neutralizing material to neutralize condensed acid, it is in most cases more economical to supply the neutralizing material with a separate smaller volume stream through a conduit 33' and with a much higher concentration. In such case the wash liquid is primarily water with a small concentration of neutralizing base material to keep its pH above seven, preferably about 11.

The operation of thermal section 10 is as described in the aforementioned copending patent application whereby the rotary air preheater 22 operates with a flue gas exit temperature that is above the acid dew point level. The use of a wash-arm 32' with preheater 22 serves to periodically clean the preheater while the preheater is on-line without having to take the preheater off-line.

Air preheater 24, however, causes a heat exchange from the flue gas 18 to the combustion air 16 so that the flue gas temperature at outlet 36 is well below the acid dew point. As a result, any gaseous $H_2SO_4$ formed in the flue gas condenses out as acid $H_2SO_4$ in rotary heat exchanger 24. Accordingly, rotary heat exchanger 24 is further rinsed with a separate neutralizing liquid. This may be supplied through a bank of misters 38 located as shown in FIG. 1 over a portion of the side 40 of the rotor 42 where flue gas enters. However, preferably the neutralizing liquid is primarily supplied through a separate conduit 33' in a manner as further explained with reference to FIGS. 2 and 3.

The separate neutralizing stream of liquid or powder is preferably formed with ingredients suitable for absorbing and neutralizing various pollutants in the flue gas. These pollutants may be $SO_2$, $SO_3$ (in the form of $H_2SO_4$) and others, for which absorption and neutralizing techniques are well known, see for example some of the aforementioned prior art publications. An alkaline wash liquid may be used, for example a water based solution of NaOH, to neutralize acid ($H_2SO_4$) condensed from $H_2SO_4$ gas. The neutralizing liquid preferably is formed with a high concentration of neutralizer material so that this will form a protective layer when the neutralizer liquid dries. The concentration of the neutralizer preferably is set sufficiently high to deliver the layer to all preheater surfaces and should be at least above the stoichiometric level for neutralization of the condensed acid. In case of a powder the neutralizer stream has a concentration of about 100%. Preferably a neutralizer liquid with a concentration of up to about 50% by weight such as a water base solution containing about 50% by weight of NaOH can be used. Other neutralizer materials may be used such as KOH and CaOH or MgOH or other basic compounds depending upon the costs as well as compatibility of the neutralizer material with the removal of salts formed by the reaction of condensed $SO_3$ ($H_2SO_4$) with the neutralizer and subsequent waste material processing. Neutralizer materials capable of forming highly soluble salts are preferred. The amount of neutralizing liquid is selected sufficiently low to minimize excessive wetting, yet sufficiently high to accommodate water evaporation, which may be about 25%, and still assure complete heat exchanger surface coverage.

The operation of rotary air preheater 24 has been found dependent upon the extent of the two phase, wet and dry, conditions arising from the application of liquid to wash away particulates and pollutants. A typical net fuel saving can be obtained with a dry condition, about 4.36%, but in such case condensed sulfuric acid unacceptably attacks the equipment. The addition of an on-line liquid stream for protection of heat exchanger 24 and the neutralization of condensed acid to avoid its attack on down stream equipment reduces theoretical maximum net fuel savings to about 4.26% (exclusive of reheating requirements). Generally, the less liquid needed to protect heat exchanger 24, the easier it is to approach high fuel savings.

In another technique for protecting the rotary air preheater against attack by acid, a neutralizing liquid mist is directed at the rotor 42 such as on its flue gas side 40 by a bank of misters 38 extending across the active region of the rotor. The neutralizing liquid contains an amount of neutralizer material that is sufficient to more than stoichiometrically neutralize condensed acid. In a practical system the neutralizing material is at least equivalent in weight, and usually significantly higher, to the weight of $H_2SO_4$ condensed over the time period for which protection against acid attack is required and is a function of factors such as the type of fuel and boiler load. Since the amount of acid is a function of the acid dew point temperature in the flue gas, a suitable acid dew point temperature sensor 39 is employed and applied to a control 41 for regulating the amount of neutralizing liquid and assure protection against corrosion attack.

The localized wash liquid stream is applied to the rotary heat exchanger in a manner sufficient to timely remove condensed corrosive constituents, i.e., before corrosive damage to the heat exchanger occurs, while reducing the cooling effect of the liquid on the heat exchange process. The wash liquid is, therefore, applied in a controlled manner whereby at any one time the amount of wetted surfaces of the wheel in rotary air preheater 24 is limited. The advantage of limiting wetting of the rotor surfaces is illustrated in FIG. 2A where a curve 43 approximately represents the efficiency of rotary heat exchanger 24 as a function of the percentage of wetted surface areas. Curve 43 illustrates that efficiency decreases to a minimum level with increased wetness. Although the amount of wetted surfaces can vary considerably depending upon the particular application, a high heat exchange efficiency can be retained by limiting the wetted surfaces to a zone that occupies generally less than about ten (10) percent of the total heat exchange surface area of the rotary heat exchanger 24. In a full scale plant, the wetted area of the rotary heat exchanger would preferably be no more than about 4% of the surface area of the heat exchange media.

One technique for applying the wash liquid stream involves the periodic application of a flooding amount of liquid to discrete portions of the rotary heat exchanger at sufficiently short intervals to prevent corrosive damage. The intervals may be related to the rotation of the rotary heat exchanger such as by effectively flooding the rotor once every several or more rotations of the rotary heat exchanger 24. The liquid is preferably applied to that part of the rotor where it is about to leave the region where combustion air passes through to move into the region where flue gas passes through.

With reference to FIGS. 2 and 3, the rotary heat exchanger 24 has a rotor 42 within a rotor shell 44. The rotary air preheater 24 includes a combustion air side 46 that is separated from flue gas side 40 by a dead-zone 48 where the rotor 42 has a rotor post 50 and bearing (not shown). The rotary preheater 24 has, except as modified for this invention, a conventional construction as may be obtained, for example, from companies such as Combustion Engineering or The Air Preheater Company. The rotary air preheater 24 includes heat exchange elements 52 (see FIG. 5) that are arranged in chordal directions relative to the axis of rotation in sector baskets 54 (see FIG. 4).

Returning to FIGS. 2 and 3, air preheater 24 is provided with a pivotally mounted and driven wash arm 32 carrying a pair of conduits 33, 33', each of which is respectively coupled to pressurized supplies 35, 35' of liquid wash water and neutralizer liquid. Each conduit 33, 33' terminates in a nozzle 56, 56' respectively. The nozzles 56, 56' are downwardly oriented to eject a localized stream of liquid onto the rotor 42. Wash arm 32 is movably mounted at pivot 57 so that nozzles 56, 56' traverse a zone 58 that crosses the entire rotor 42. The streams of liquids thus can, by passing along zone 58, treat the entire rotor 42 along a spiral path as the rotor is rotated during operation of the rotary heat exchanger 24.

Generally the neutralizing stream is so located that the region of the rotor exposed to it is covered by a dry neutralizing material after the liquid has evaporated. In the illustrated embodiment, the nozzles are radially spaced from each other at a distance that is so selected that the wash stream nozzle is sufficiently spaced from the neutralizer liquid stream so that the latter is applied to a rotor zone that is almost dry and thus at a sufficiently low temperature to prevent excessive evaporation of the neutralizing stream before it has been applied through the axial extent of the rotor. One such spacing between nozzles 56, 56' may be such that the wash stream nozzle 56 wets the rotor along a spiral path that is in effect several rotor revolutions spaced from the spiral path traced by the neutralizer liquid stream from nozzle 56'. With such spacing the portion of the rotor to which the neutralizer liquid is applied has at least almost essentially dried. As the neutralizer liquid contacts the rotor, its heat exchange surfaces are coated with an initially liquid neutralizer film which, as it dries, leaves a protective layer of neutralizing material. When a powder neutralizer material is used the surfaces are sufficiently wet, though preferably almost dry, to aid in the adherence of the powder to the heat exchanger surfaces.

For this purpose a high concentration of alkaline neutralizing material is used, such as a solution in the range from about 15% up to about 50% of NaOH. Generally a concentration in the range from about 15% to about 30% is used with higher concentrations such as 50% if these are deliverable to the rotary heater elements. This enables the formation of a layer that reacts with condensed acid to form a protective salt layer. The surface protection persists for a long time depending inversely upon the amount of sulfur in the fuel and the rate of conversion of $SO_2$ to $SO_3$. Generally it is estimated that with a solution in the range from about 15% to about 50% of NaOH, a protective layer is formed that could protect the rotor for about 60 hours with a flue gas formed with a 2% sulfur fuel and containing $SO_3$ converted at a 3% rate. In practice the interval between washes also is a function of the amount of particulates that accumulate and tend to clog the rotary preheater. Hence, the amount of sulfur in the fuel, the amount of particulates accumulating in the rotary heat exchanger and the concentration of the neutralizer affect the interval between wash cycles. A rotary heat exchanger in practice is preferably continuously washed and coated with neutralized material so as to complete the washing and coating of the entire unit in about eight hours.

The traversal of wash arm 32 to clean and treat rotor 42 may thus occur on an intermittent basis. In such case the amount of wetted surfaces of rotor 42 aggregated over the interval between intermittent washings can be a small percentage of the dry surfaces in operation during an interval so that in effect the rotary heat exchanger is operated at a high efficiency for most of the time. It is still desirable in such case to prevent the carryover of liquid to the air flow side 46.

Operation of the liquid streams in FIG. 2 occurs in a single direction depending upon the relative positions of the wash liquid nozzle 56 and neutralizing liquid nozzle 56'. In the embodiment as shown in FIG. 2, the liquid streams from nozzles 56, 56' are applied simultaneously as the wash arm 32 moves outwardly in the direction of arrow 70 from the central part of the rotor 42.

In the event the liquid streams must be operated in both pivot directions of wash arm 32 a third neutralizing liquid nozzle 56" could be placed on the other radial side of wash liquid nozzle 56. In such case, nozzle 56' would be operated during movement of wash arm 32 in the direction of arrow 70 and nozzle 56" would be operated during movement in the opposite direction.

The rotation of rotor 42 is as shown in the direction of arrow 60 about a vertical axis. The zone 58 is, therefore, located at the hot axial end 62 where flue gas enters and combustion air exits while near the region where the rotor leaves the combustion side 46 and enters the flue side 40. The zone 58 is preferably located in the air side 46, though it may be in the dead zone 48 or in the flue side 40. Hence, as the streams of washing liquid and neutralizing liquor are applied to the rotor 42, both liquids are preferably given a maximum available time to drain from the wetted heat exchange elements 52 before these are again rotated into the combustion air side 46.

The localized stream of washing liquid from nozzle 56 is a solid spray under high pressure. Pressures may be in the range from about 200 to about 3,000 psi, preferably about a 1,000 psi. The liquid volume should be sufficient to cleanse the entire axial portion of the heat exchange elements over which the nozzle 56 is located. The cleansing includes the dislodgement of particulates and condensed materials and of salts left from previous exposure to the neutralizing stream.

With a powerful localized stream of liquid, the splashing effect from horizontal cross bars and other structural members as these pass beneath the liquid stream tends to cause severe wetting of heat exchange elements intended to remain dry. Such splashing is particularly undesirable when liquid is splashed into the combustion air flow or interferes with the operation of the nearby neutralizing liquid. One aspect of the invention, therefore, involves, as shown in FIGS. 2 and 3, the addition of splash guards 66 that are mounted in chordal directions on each sector basket 54. The splash guards 66 are formed of vertically oriented plates that are spaced a small distance, of the order of about a half inch, from each other and reach up towards the nozzles 56, 56' for a distance selected to inhibit radial splashing of the liquid stream though permitting splashing along chordal directions. Such splash guards can be deleted when the media, i.e., the rotary heat exchanger, is designed to avoid structural members directly below the liquid streams.

When a strong localized liquid stream is applied to a zone such as 58, liquid may spill into the air side 46 at the lower axial end 62' of the preheater 24. A drain trough 68 is, therefore, provided below zone 58 to capture any liquid that may tend to flow back towards the air side. This trough advantageously provides a slightly extended dead-zone so that incoming combustion air flows around the nozzles 56, 56' and entrainment of liquid therefrom into the boiler 12 is minimized. The liquid collected by trough 68 is passed through a trap 69 to a main liquid collector 71 located below preheater side 40. Traps such as 69, 69' are sized to accommodate gas pressure differences between sides 40 and 46 of the air preheaters.

In some air-preheaters the shaping of the heat exchange elements (the media plates) with double undulations promote channeling of the wash liquid and neutralizing liquid, thus tending to cause non-uniform wetting of the media surfaces.. When the media plates are made notched flat as shown at 69 in FIG. 3A, the channeling can be eliminated.

Media design, however, has been found to affect the ability of rotary heat exchanger 24 to extract all of the condensed $H_2SO_4$ from the flue gas stream. This problem arises when the hot flue gas, after it has entered preheater 24, generates an aerosol of condensed $H_2SO_4$ droplets which do not become attached to the media plates and tend to pass through. Such aerosol condition tends to arise when the flue gas mixes with eddy flows of gas chilled by the media plates. This in turn cools free flowing portions of the flue gas below the $SO_3$ condensation temperature and allows the formation of $H_2SO_4$ droplets that are entrained right through the preheater 24.

When the apertures or cross-sectional dimensions of the passages between media plates are made sufficiently small, however, aerosol formation of condensed $SO_3$ is avoided. In such case the flue gas is forced into intimate contact with the media plates, eddy flows are suppressed and virtually all of the $SO_3$ condenses out on media surfaces.

Figure 3B:
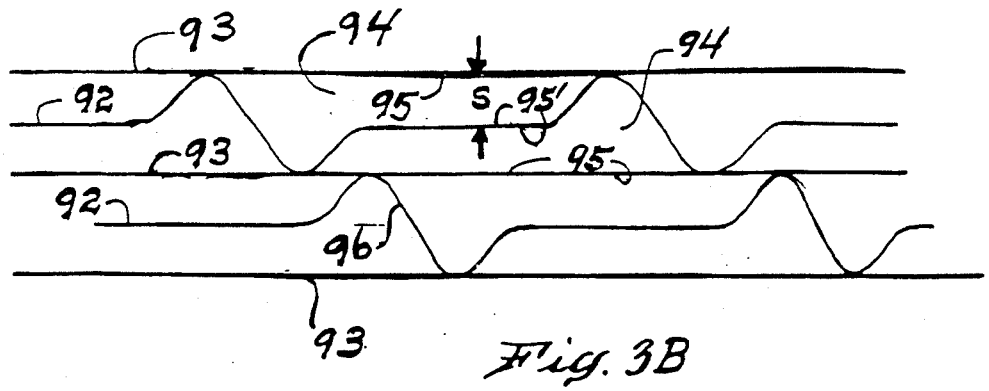
FIG. 3B is a partial, horizontal sectional view of one form of a media assembly employed in accordance with the invention.
Figure 6:
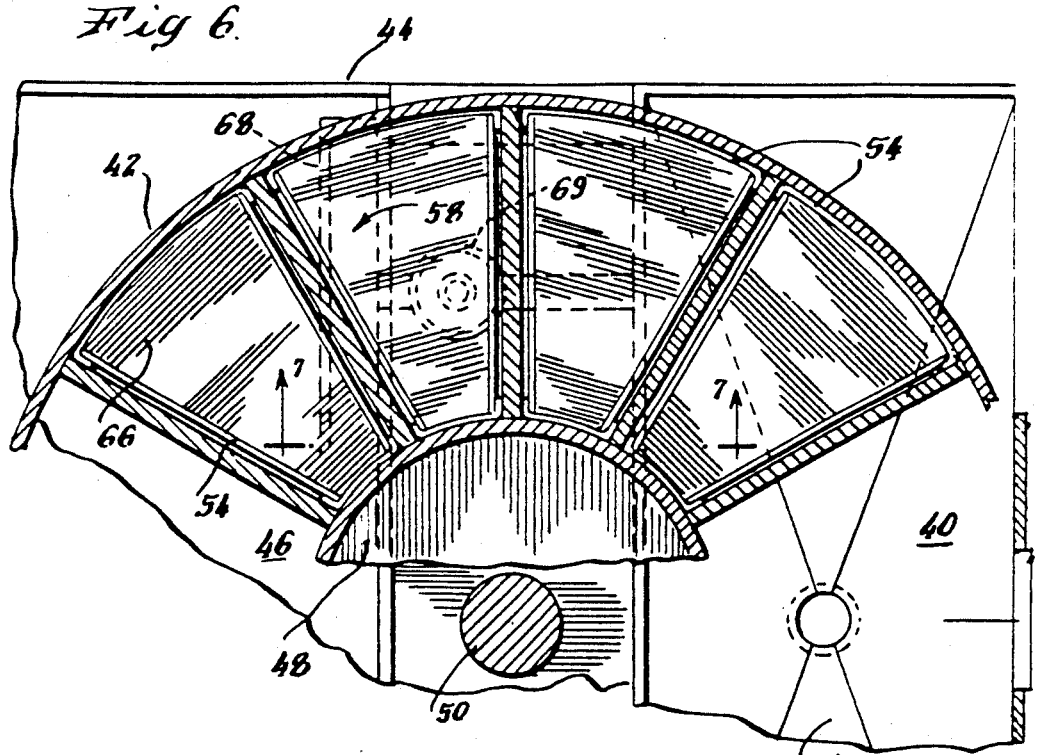
FIG. 6 is an enlarged partial top plan view of the air preheater shown in FIG. 4.
Figure 7:
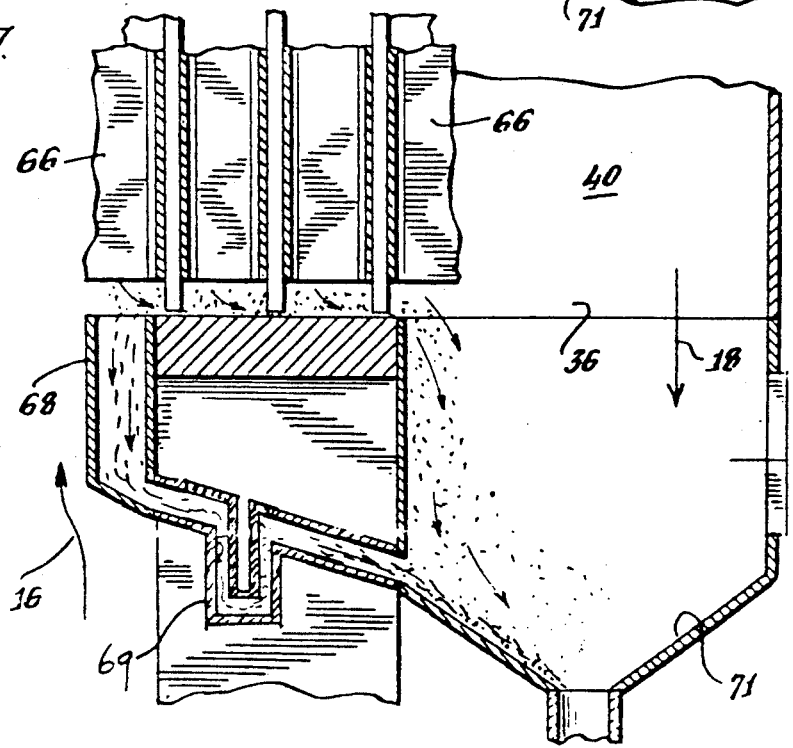
FIG. 7 is a vertical section view of the air preheater of FIG. 6 taken along the line 7—7 therein.

Hence, as shown in FIG. 3B the media plates 92, 93 are so designed that the cross-sectional dimensions of the passages 94 through which the flue gas 18 passes are selected to suppress the formation of condensed $SO_3$ aerosol droplets. The dimension or specific shape of passages 94 may be varied; however, aerosol conducive conditions were suppressed when the maximum cross-sectional dimensions between main cooling surfaces such as 95, 95' in passages 94 was held to about one tenth of an inch (about 2.5 mm). A media plate configuration as shown in FIG. 3B was found effective. The size of some passages may be increased such as at the undulations 96 that are used to space the plates 92, 93. However, generally the cross-sectional dimensions of the passages are selected to promote laminar flow and are generally less than about 0.2 inches (about 5 mm) and preferably about 0.1 inch.

With reference to FIGS. 4-7, further details of rotary air preheater 24 are shown. In FIG. 4 the wash arm 32 is shown driven back and forth as suggested by arrows 70—70' by a motor driven mechanism 72. This may include a reversible motor that is reversed each time washing arm 32 reaches a limit position as detected with a limit switch. The speed of the wash arm movement is selected sufficiently slow to assure complete rinsing of rotor 42. Rotation of rotor 42 is obtained in a well-known manner with a conventional variable speed motor 73 whose output shaft has a gear that meshes a ring gear located around the outer periphery of rotor 42.

In the embodiment shown the wash arm 32 is pivotally mounted at a pivot 57 near the external wall. This shortens the radius of curvature of the path traversed by nozzles 56 and tends to increase the width of zone 58 to assure complete coverage of the rotor 42 by the wash liquid. Another technique for moving the nozzles 56 would involve, as shown in FIG. 2, a hydraulic or mechanical actuator 74 having a movable piston 76 to which nozzles 56, 56' would be mounted and moved along zone 58. The conduits 33, 33' could be made of flexible hoses to accommodate such piston mounting of the nozzles. Instead of actuator 74 a track could be used.

The motion of wash arm 32 or piston 74 is controlled by a controller 77 (see FIG. 4) to impart a variable speed. Thus as nozzles 56, 56' are moved radially outwardly, their speed reduces so as to deliver a generally uniform amount of wash liquid and neutralizing liquid to the entire rotor 42. Such speed is preferably made inversely proportional to the radial position of the nozzles 56, 56' relative to the center of rotor 42. In one embodiment contemplated in accordance with the invention the wash liquid is applied by a plurality of radially closely spaced nozzles, each of which operates under a high pressure, say a 1,000 psi, to deliver a solid stream that may be of the order of an eighth of an inch wide when it first reaches the media. These streams are radially adjacent to each other to provide a somewhat radially elongated continuous spray zone.

Nozzle 56' preferably is so oriented as to reduce losses as may arise from a direct pass through and thus assure impact of the neutralizing liquid on the media plates 52 of rotor 42. This is obtained by orienting nozzle, such as 56', at an angle relative to the planes of media plates 56, 56' as shown in FIG. 5. Such angle A may for example be of the order of about 30° relative to the orientation of the planes of the media plates at the location where the nozzles 56' operate. Preferably, however, the neutralizer spray has a conical, hollow shape that is directed vertically down onto the top of the media plates that need to be protected to thus apply the spray over a sufficiently wide area. The cone angle preferably is greater than about ten degrees to minimize neutralizer liquid loss through media passages.

Enhanced protection of the rotary heat exchanger against corrosion from condensed acid is obtained by the adoption of the features as shown in FIGS. 8-10. In FIG. 8 a conventional rotary air preheater 100 is shown but modified in accordance with the invention. The air preheater 100 is shown, for clarity, without the wash and neutralizer liquid delivery system. The air preheater 100 includes a rotor 102 inside a rectangular shell 104 so that a plenum space 105 between rotor 102 and shell 104 is formed. Such plenum 105 is isolated from the combustion air and flue gas flows by the use of stationary seals, as shown in FIG. 9, such as inner and outer circumferential seals 106, 106', 108, and 108' mounted to shell 104.

The rotor 102 typically is made of different segments such as the hot end heating elements 110 and cold end basketed heating elements 112. The latter basket elements 112 are replaceable through an opening covered by a panel 114. As a result of such construction there is likely to be some flue gas leakage through apertures, gaps and the like as well as past seals that are either worn out or do not provide a proper seal. Hence, flue gas containing corrosive constituents such as condensed acid may enter the plenum 105 and cause damage to the metal.

In the embodiment of FIG. 8 the entry of flue gas into the plenum is inhibited by pressurizing the plenum by a small differential pressure above the highest flue gas pressure at the rotary heat exchanger 100. This is done by bleeding a small amount of the flow of air 16 on the air side into the plenum 105 through a duct such as 116 that extends from the air discharge side to the plenum 105.

The pressurization of the plenum 105 may be done in different ways. One technique as shown in connection with FIG. 9 utilizes a pair of pressure sensors 118, 120 located respectively in the plenum 105 and the flue gas duct 122. The sensors 118, 120 may be of the pneumatic type and coupled to a differential pressure sensor 123 whose output is compared at 124 with a reference 126 to produce a control signal on output 128. The control signal in turn is applied through an appropriate actuator 130 to set a valve 132 inside duct 116 so that the pressure in plenum 105 is at the reference level 126. Electrical controls may be used where temperature conditions permit this.

The plenum gas pressure is kept small to reduce the flow of air from the plenum into the flue gas stream and thus reduce waste of fan power. Yet the pressure is sufficiently high to prevent gaseous $SO_3$ or condensed acid from entering the plenum 105. The plenum air pressure may be from one to several inches of water above the flue gas pressure.

In a conventional rotary heat exchanger, the distribution of the wash and neutralizer streams tends to broaden as the liquids drain from one set of heating elements 110 to the next layer of elements 112. This increases the wetted zone of the rotary heat exchanger and may affect the even application of the neutralizer liquid. Hence, it is preferred that a rotary heat exchanger is used in which the wetted zone can be confined to the smallest that is needed and in which neutralizer material can be reliably applied to all surfaces. One technique for accomplishing even wetting involves the use of heating elements 52 that extend, as shown in FIGS. 5 and 9, in a continuous uninterrupted manner from one axial end 62 to the other 62' of a rotor 42.

The application of the wash and neutralizing liquids from the hot end of the rotary air preheater may be supplemented with was and neutralizing liquid streams applied from the cold end as shown in FIG. 10. A wash liquid stream is shown applied by a nozzle 140 to cold end 62' in radial and circumferential alignment with the wash liquid stream from nozzle 56. A neutralizer stream from nozzle 56'. The nozzles 56, 140 and 56', 142 are respectively moved in unison to limit the size of the wetted zone while assuring the application of wash and neutralizing liquids to all heating elements 52 as well as other component surfaces of rotor 42. Movement of nozzles 140, 142 relative to rotor 42 may be done in synchronization with and in the manner as described with reference to nozzles 56, 56' in FIG. 4. The application of the liquid streams to cold end 62' enhances the protection of the rotor 42 against acid corrosion without significantly affecting the rotor temperature. The amount of wash liquid and neutralizer liquid applied by nozzles 140, 142 can differ from that applied by nozzles 56, 56' depending upon the desired depth of penetration.

FIGS. 10 and 11 further illustrate an alternate technique for pressurizing the plenum 105. The upper outer stationary circumferential seal 108 is intentionally provided with an enlarged gap or slot 148 so as to provide an air passage 150 between the hot air flow side and the plenum 105 to enable air to flow as suggested by arroid 152. The size of gap 148 is selected to establish the desired plenum pressure. The size of gap 148 may be fixed or controlled with a slide valve. Alternately, a duct can be provided between the air flow side and plenum with a slide valve, not shown, positioned to regulate plenum pressure.

A significant improvement in the overall efficiency of the thermal section 10 is obtained with a heat exchanger 24 with which a substantial portion of heat in the flue gas 18 is recovered while pollutants are removed and the heat exchanger 24 is protected against corrosive effects of the removed pollutants. The gross fuel savings for a typical utility plant is about 4.36% which is the equivalent of about 12.5% cycle efficiency improvement for an electric generating station having a current cycle efficiency of 35%. The net fuel saving of the thermal section depends upon a number of factors such as the type and nature of the fuel, the amount of excess air in the combustion process and the temperature difference between the combustion air and the flue gas when it exits the air preheater 22. Typically, for 15% excess air and a flue gas temperature difference of 200° F. across air preheater 24 a net fuel savings of about 4.26% for heat recovery alone can be obtained. Net fuel savings means the efficiency improvement after the energy requirements for operation of the additional preheater 24 are taken into account. These generally are about 0.1% when heat recovery alone is considered or about 0.53% for energy needed for both heat recovery with full pollution controls for $SO_2$ and particulates removal at a 99% rate.

The thermal efficiency depends upon a number of factors such as the rotational speed of the rotor wheel 42, the air mass flow and the amount of liquid used in the cleaning of the heat exchanger.

Rotor wheel speed has been found to strongly influence the obtainable fuel savings. Thus, commonly used speeds of the order of about 4 rpm have been found to allow too little time to evaporate liquid and causes excessive carry-over of liquid to the air flow side 46. Too low a speed, however, may lead to inadequate heat transfer performance by the air preheater. The rotary speed needs to be sufficiently low to enable a draining of liquid introduced by the localized stream with drain time being a function of axial size. Generally, the rotary speed should be less than about one rpm with the speed preferably selected in a range less than about 0.75 rpm. A wheel speed of about 0.25 rpm for a six foot axial length has been found to be optimum.

Another factor that significantly affects the net fuel savings obtained with a rotary air preheater 24 is the heat capacity of the air, $H_a$, in relation to the heat capacity of the wheel $H_r$ and the heat capacity of the liquid, $H_L$. These heat capacities are each variable depending respectively upon the mass flow of the air, the rotational speed, wheel depth and wheel diameter of the rotor wheel 42 and the total amount of liquid (including the wash and neutralizing liquids) applied to the heat exchanger.

Net fuel savings can be achieved over a wide range of conditions for rotor wheel speed, air mass flow and liquid flow with the percentage of net fuel savings varying as well. Although it might be desirable to achieve a maximum net fuel saving, the particular operating parameters for a heat generator may required compromises that would limit fuel savings. A practical limit of a least acceptable fuel saving would be dictated by the capital costs needed to implement the invention and the resulting pay-back time. This places a practical minimum acceptable net fuel saving generally at about two percent (2%) when considering the costs involved in only a recovery of heat.

The air flow mass (not including the approximately 6% additional mass added by the combustion of fuel), and the size of the rotary air preheater 24 are determined according to standard well known principles applicable to power plants. When an air preheater 24 for this invention is to be used with a particular air flow, the size of the air preheater is selected so that the pressure drop is preferably held to a limit which should not be exceeded (for example 15" of water). As a result, scaling of air-preheater 24 to different requirements leaves the axial depth of the rotor 42 normally fixed regardless of size for most standard applications. The flow of wash liquid is selected in an amount sufficient to wash away particulates and salts formed on the heat exchanger elements. The amount of wash liquid preferably is in the range between about 0.3 to 5.0 gallons per minute for each megawatt of electricity generating capacity (gpm/Mw).

The total liquid flow preferably is set at as low a level as possible which level is a function of the amount of evaporation of the wash stream. This may be of the order of about 0.3 gpm/Mw and optimum flow, depending upon the size of the rotary heat exchanger is likely to be between 0.5 and 1 gpm/Mw and probably closer to 0.5 gpm/Mw. The amount of neutralizer liquid applied may vary, but preferably is in the range from about 0.05 to 1 gpm/Mw, depending upon the concentration of the neutralizer agent in the stream. Generally, the higher the concentration of neutralizer agent the lower the volume. A preferred flow rate is about 0.05 gpm/Mw with a neutralizer concentration of 25% by weight. Higher liquid flows can be used, particularly when higher air flows are employed so that the ratio of heat capacity of air $H_a$ to the heat capacity of the liquid remains at a high level or when the wash liquid can be applied infrequently after long intervals. Too much wash liquid should be avoided lest it would cause a head of liquid to form in the space between heat exchange elements.

In order to obtain a minimum acceptable fuel saving, the ratio of the heat capacity of the air flow to the heat capacity of the rotor 42, $H_a/H_r$, should be greater than about 0.02 and the ratio of the heat capacity of the air to the heat capacity of the liquid, $H_a/H_L$ should be greater than about 2, with the speed of the rotor 42 generally less than about 0.75 rpm. At lower rotor speeds the ratio $H_a/H_r$ should be increased to a level in excess of about 0.14 with the ratio of $H_a/H_L$ increased somewhat to at least greater than 2.5.

With a ratio $H_a/H_r$ above about 0.3 maximum gross fuel savings can be obtained by correspondingly assuring that the ratio $H_a/H_L$ is sufficiently high, preferably greater than about 10.

For near maximum gross fuel saving operation, the ratio $H_a/H_r$ can be set greater than about 0.43 with the ratio $H_a/H_L$ somewhat lower, but still greater than about five (5). At higher values of $H_a/H_r$ in excess of above 0.86 with $H_a/H_L$ greater than about 5, a maximum gross fuel savings can be achieved, In summary, therefore, the greater the maximum air flow, the higher the resulting fuel saving though the maximum air flow cannot be indefinitely increased lest the pressure drop across the rotary air preheater 24 becomes too high.

The efficiency advantage of the invention can further be illustrated with the following Table 1 normalized for a heat generator using one pound of combustion air and assuming a mass of flue gas of 1.06 pounds for a number 6 type of fuel oil with 15% excess air. It is assumed that an air reheater 31 for plume suppression is needed, thus reducing the fuel savings by about 0.4% depending upon the water dew point temperature in the flue gas.

| Places in FIG. 1 | Temperature |
| --- | --- |
| At air inlet 80 | 70° F. |
| At outlet 82 | 297° F. |
| At boiler inlet 84 | 611° F. |
| At boiler outlet 20 | 650° F. |
| At reheater inlet 86 | 320° F. |
| At reheater outlet 88 | 300° F. |
| At preheater outlet 36 | 120° F. |
| At stack 24 | 110-140° F. depending on water dew point temperature |

The application of a wash liquid during operation in accordance with the invention to the first rotary air preheater 22 advantageously enables periodic cleaning of materials that clog the preheater to thus reduce the load on combustion air fan 28 and induced draft fan 30. As a result, the intervals between heat generator down times for the cleaning of preheater 22 can be considerably lengthened. The advantage of such on-line cleaning can be appreciated when one considers that normal operation requires dropping a 300 megawatt generator and a corresponding load every six weeks for periods ranging from 8 to 24 hours to effect a cleaning of the air preheaters. Cleaning often also uses expensive high pressure steam for soot blowing. Since dropping generator capacity affects peak reserve capacity, electrical power may have to be purchased to accommodate cleaning. A cleaning of air preheater 22 with a wash system as is used in air preheater 24 enables substantial lengthening of intervals between the times the air preheater is taken off-line for inspection or other servicing.

Furthermore, in certain heat generators an additional combustion air preheater that is located ahead or upstream of the preheater 22 is used. Such additional preheater serves to assure a minimum temperature for the combustion air and thus avoid condensation of corrosive constituents, such as $H_2SO_4$, in the flue gas in the preheater 22 during cold ambient air temperatures. The application of liquid to preheater 22 will thus also allow a deletion of such additional air preheater for an improvement in the heat generator thermal efficiency.

In conventional wet flue gas desulferization systems problems are encountered at dry/wet interfaces. Such interfaces occur on surfaces inside ducts and the like leading to or inside the scrubber and permit a build-up of particulates to blockage levels. In conventional wet scrubbers, therefore, a pre-quenching of the flue gas is undertaken to create a water-saturated flue gas stream. The pre-quenching cools the flue gas but adds a significant mass flow, in the form of water vapor and droplets, to the flue gas. The additional mass flow imposes additional power demands on the fan 30.

Figure 12:
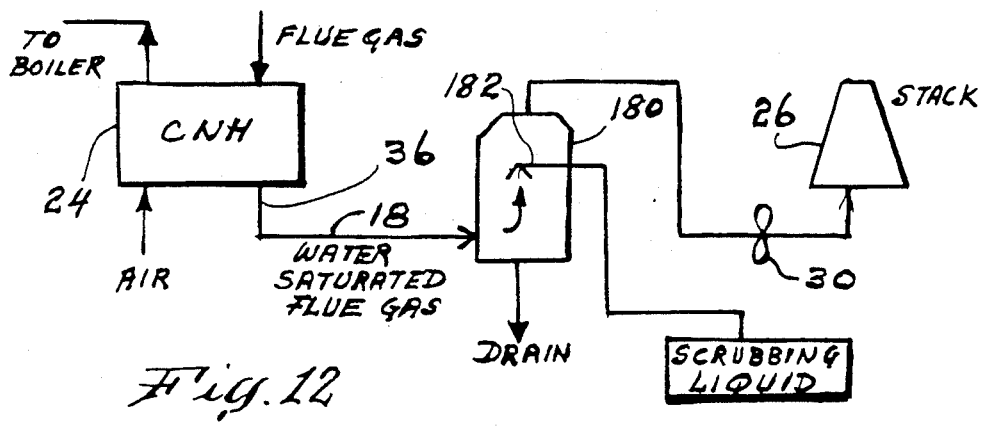
FIG. 12 is a schematic representation of a technique to apply a scrubber to a flue gas pollutant condensing neutralizing heat exchanger (CNH).

An advantage with an improved heat generator in accordance with the invention is that flue gas can be directly supplied to a wet flue gas desulferization system without pre-quenching of the flue gas. For example, with reference to FIG. 12 the rotary heat exchanger 24 is operated or selected so that the amount of heat transferred from the flue gas is sufficient to lower its temperature to a level where the flue gas is water saturated at discharge end 36. This eliminates a downstream dry/wet interface.

The water saturated flue gas may then be directly fed into the wet scrubber 180. This includes a suitable spray system 182 to remove pollutants from the flue gas which is then discharged to stack 26 by the action of fan 30.

The water saturated flue gas uses the water inside the gas stream itself and does not result in additional loads on fan 30. Particulates build-up problems are avoided since cooler duct surfaces will be wet and tend to have water-running conditions. Standard corrosion resistant materials used for typical scrubbers are used on ducts guiding the saturated flue gas to the scrubber 180. This protects against water aerosols in the presence of $CO_2$ and $SO_2$ gases that combine to form carbonic acid and sulfurous acid.

Having thus described an illustrative embodiment in accordance with the invention for improving the efficiency of their thermal section for a power plant, the advantages of the invention can be appreciated. The invention can be advantageously used for different heat generators such as those used in blast furnaces, municipal waste burning plants, chemical processes and the like. Variations from the described embodiment can be made such as in the selection of the washing liquid without departing from the scope of the invention.

What is claimed is:

1. A method for improving the efficiency of a heat generator wherein an inflow of air is used and a hot gas is generated which exhausts as a flue gas at an elevated temperature and contains particulates and gaseous pollutants, comprising the steps of:

passing the flue gas and the inflow of air into axial ends of a rotary heat exchanger having a rotor for the transfer of heat from the flue gas passing on one side to said inflow of air passing on another side for a preheating of the air by virtue of rotation of the heat exchanger, wherein the heat exchange relationship between the inflow of air and the flue gas is sufficient to reduce the temperature of the flue gas from a transfer of heat therefrom to the inflow of air for an enhanced thermal efficiency of the heat generator, and with the temperature of the flue gas being reduced by said transfer of heat by said heat exchanger to a level where at least one of said pollutants condenses out from the flue gas within the heat exchanger;

during said heat transfer directing a localized stream of wash liquid and neutralizer material at the axial end of the rotary heat exchanger where the flue gas enters and the air exits to remove particles and pollutants from heat exchange elements of the heat exchanger, with said neutralizing material being in an amount sufficient to establish a dry neutralizing layer on surfaces of the rotary heat exchanger so as to protect the surfaces against acid condensed from the flue gas within the rotary heat exchanger for an extended interval of time; and during said heat transfer moving the stream of wash liquid along a zone located at said latter axial end and in the vicinity of the region where a rotor in the heat exchanger leaves the air side or enters the flue gas side, said zone being further oriented to rinse the entire rotary heat exchanger as this is rotated past the stream of wash liquid.

2. The method as claimed in claim 1 and further comprising the step of:

during said heat transfer rotating the heat exchanger at a speed selected sufficiently low to enable substantial drainage of liquid from wetted heat exchange elements prior to their reentry into the air flow side of the rotary heat exchanger, for an enhancement of heat exchange efficiency during exposure to said stream.

3. The method as claimed in claim 1 wherein said step of moving the liquid stream varies in speed as a function of the distance of the stream from the rotor axis of rotation.

4. The method as claimed in claim 1 and further comprising the step of:

capturing the portion of the liquid which passed through the rotary heat exchanger and is flowing towards the side where the inflow of air passes so as to prevent this liquid portion from entering the inflow air.

5. The method as claimed in claim 4 and further comprising the step of:

applying a mist of neutralizing material in the vicinity of said boundary onto the flue side of the rotary heat exchanger.

6. The method as claimed in claim 5 wherein the amount of said neutralizing material is selected significantly higher than that required for stoichiometric neutralization of condensed acids.

7. The method as claimed in claim 6 wherein the neutralizing material is in the form of a liquid spray with the amount of neutralizer liquid being at least eight times what is needed for stoichiometric neutralization.

8. The method as claimed in claim 1 and further comprising the step of:

during said heat transfer applying to said rotary heat exchanger along said zone and to a portion of the rotor previously washed by the stream of washing liquid a stream of neutralizing material in an amount sufficient to establish said dry neutralizing layer for protection against sulfuric acid condensed from the flue gas within the heat exchanger.

9. The method as claimed in claim 8 wherein said neutralizing stream is a liquid containing said neutralizing material with a concentration in the range from about 15% to about 50% by weight.

10. The method as claimed in claim 8 wherein said neutralizer stream is a powder neutralizer material.

11. The method as claimed in claim 8 wherein said stream of neutralizing material is applied at a distance from the stream of wash liquid with the distance selected to enable the portions of the rotor exposed to the wash liquid to pass through a predetermined number of revolutions of the rotor before being exposed to said neutralizing stream.

12. The method as claimed in claim 8 wherein said stream of neutralizing material is applied at a rotor portion selected to be almost dry after having been exposed to the stream of wash liquid.

13. The method as claimed in claim 8 wherein said neutralizer material is a powder and is applied to a rotor portion selected to be sufficiently wet after having been exposed to the stream of wash liquid.

14. The method as claimed in claim 13 wherein said selected rotor portion is almost dry.

15. The method as claimed in claim 8 wherein the neutralizing stream is a liquid stream and is applied at an angle relative to the plane of heat exchange elements so as to assure impact by said stream on the elements.

16. The method as claimed in claim 1 wherein the step of directing the localized stream of wash liquid produces wetted surfaces that are generally less than about ten percent of the total heat exchange surface area of the heat exchange elements.

17. The method as claimed in claim 1 wherein the heat exchanger is rotated at a speed that is less than about one revolution per minute and with the speed selected commensurate with the axial length of the rotor of the rotary heat exchanger.

18. The method as claimed in claim 1 wherein the rotary heat exchanger is selected so that the ratio of the heat capacity of air, $H_a$ to the heat capacity of the rotor, $H_r$, is greater than about 0.05 at full load.

19. The method as claimed in claim 18 wherein the amount of washing liquid is further selected so that the ratio of the heat capacity of air $H_a$ to the heat capacity of the liquid $H_L$ is greater than about 0.2 at full load.

20. The method as claimed in claim 19 wherein the ratio of $H_a/H_L$ is greater than about two.

21. The method as claimed in claim 20 wherein the ratio of $H_a/H_r$ is greater than about 0.85 and the ratio of $H_a/H_L$ is greater than about 5.

22. The method as claimed in claim 18 wherein the ratio $H_a/H_r$ is greater than about 0.3.

23. The method as claimed in claim 1 and further comprising the step of:

inhibiting the radial dispersion of liquid from the stream.

24. The method as claimed in claim 1 and further including the step of:

pressurizing a plenum surrounding the rotor to a gas pressure level sufficient to suppress the entry into said plenum of gaseous and condensed pollutants from the side in which said flue gas passes.

25. The method as claimed in claim 24 wherein the pressurizing step comprises the step of:

applying a flow of air from the hot side of the rotor to the plenum in an amount sufficient to obtain said plenum gas pressure.

26. The method as claimed in claim 25 wherein the pressurizing step comprises the step of:

controlling said flow of air so as to establish a desired gas pressure difference between the plenum and the flue gas pressure.

27. The method as claimed in claim 26 wherein the pressurizing step establishes a plenum gas pressure that is in the range from about one to about several inches of water above the highest flue gas pressure in the rotor.

28. A rotary air preheater for improving the efficiency of a heat generator wherein an inflow of air is used and gas is generated which exhausts as a flue gas at an elevated temperature and contains particulates and gaseous pollutants comprising:

a rotary air preheater having a rotor with a plurality of heat-exchange elements, said rotor being mounted for rotation so as to move the heat-exchange elements in rotational sequence from an air side where the inflow of air passes to a flue gas side where the flue gas passes for a preheating of the air, said rotary air preheater being selected so that the heat exchange relationship between the inflow of air and the flue gas is sufficient to reduce the temperature of the flue gas from a transfer of heat therefrom to the inflow of air for an enhanced thermal efficiency of the heat generator, and with the temperature of the flue gas being reduced by said transfer of heat by the heat exchange elements to a level where at least one of said pollutants condenses out from the flue gas within the heat exchanger;

means for directing a localized stream of wash liquid and neutralizing material at the axial end of the rotor where the flue gas enters and the air exits;

means for moving the stream of wash liquid along a zone located at said latter axial end and in the vicinity of the region where a rotor in the heat exchanger leaves the air side or enters the flue gas side, said zone being further oriented to rinse the rotor as it is rotated past the stream of wash liquid; and means for rotating the heat exchanger at a speed that is sufficiently low so as to enable an effective drain down of wash liquid from the rotor prior to the reentry of wetted heat-exchange elements into the air side of the air preheater.

29. The rotary air preheater as claimed in claim 28 and further including:

means for directing a flow of neutralizing material at said rotor along said zone at a desired interval after said wash liquid so that the neutralizing material is applied to almost dry portions of the rotor.

30. The rotary air preheater as claimed in claim 29 wherein the neutralizing material flow directing means includes a spray nozzle which is mounted at a predetermined radial distance from the stream of wash liquid.

31. The rotary air preheater as claimed in claim 30 wherein said predetermined distance is sufficient to enable a plurality of revolutions of wash liquid wetted rotor portions before contact by the neutralizing material.

32. The rotary air preheater as claimed in claim 28 wherein said means for directing said wash liquid is mounted to move over a rotor zone which is located on the air side adjacent to where the rotor leaves the air side.

33. The rotary air preheater as claimed in claim 28 and further including:

means for preventing wash liquid that has passed through said rotor from flowing into the air flow.

34. The rotary air preheater as claimed in claim 33 wherein said preheater has a dead zone and said preventing means includes:

a drain extending along the dead zone in a radial direction at the axial rotor end where air enters and at the air side of the dead zone.

35. The rotary air preheater as claimed in claim 33 and further including:

a plurality of splash plates oriented along chordal directions of sector portions of the rotor and spaced from each other along radial directions by distances sufficient to suppress radial splashing of wash liquid reflected by structural elements of the rotor.

36. The rotary air preheater as claimed in claim 28 and further including:

means for supplying a mist of neutralizing liquid across a radial section of the rotor.

37. The rotary air preheater as claimed in claim 28 wherein said preheater is sized to provide a ratio of the heat capacity of the airflow, $H_a$, to the heat capacity of the rotor, $H_r$, in excess of a preselected amount.

38. The rotary air preheater as claimed in claim 37 wherein the air preheater is selected so that the ratio $H_a/H_r$ is greater than about 0.02.

39. The rotary air preheater as claimed in claim 38 wherein the air preheater is selected so that the ratio $H_a/H_r$ is greater than about 0.3.

40. The rotary air preheater as claimed in claim 39 wherein the air preheater is selected so that the ratio $H_a/H_r$ is greater than about 0.85.

41. The rotary air preheater as claimed in claim 37 wherein the wash liquid directing means provides a stream of liquid in an amount so that its heat capacity $H_L$ bears a ratio, $H_a/H_L$, that is greater than about 0.2.

42. The rotary air preheater as claimed in claim 41 wherein the heat capacity of the wash liquid $H_L$ is selected so that the ratio $H_a/H_L$ is greater than about two.

43. The rotary air preheater as claimed in claim 42 wherein the ratio $H_a/H_L$ is greater than about 5.

44. The rotary air preheater as claimed in claim 41 wherein the air preheater is selected so that the ratio $H_a/H_r$ is greater than about 0.02.

45. The rotary air preheater as claimed in claim 44 wherein the air preheater is selected so that the ratio $H_a/H_r$ is greater than about 0.3.

46. The rotary air preheater as claimed in claim 45 wherein the air preheater is selected so that the ratio $H_a/H_r$ is greater than about 0.85.

47. The rotary air preheater as claimed in claim 28 wherein the moving means comprises a pivotally mounted wash arm.

48. The rotary air preheater as claimed in claim 28 wherein the moving means comprises a hydraulically or mechanically driven piston.

49. The rotary air preheater as claimed in claim 28 wherein said rotary air preheater has a plenum surrounding the rotor; and means for pressurizing the plenum to a gas pressure level sufficient to suppress the entry into said plenum of gaseous and condensed pollutants from the rotor side in which said flue gas passes.

50. The rotary air preheater as claimed in claim 49 wherein said means includes:

an air passage interconnecting the plenum with the air inflow at the hot side of the rotor.

51. The rotary air preheater as claimed in claim 50 wherein said means further includes:

means for establishing in said plenum a gas pressure that is a predetermined amount higher than the flue gas pressure in the rotor.

52. A method for improving the efficiency of a heat generator wherein an inflow of air is used and a hot gas is generated which exhausts as a flue gas at an elevated temperature and contains particulates and gaseous pollutants, comprising the steps of:

passing the flue gas and the inflow of air into axial ends of rotary heat exchanger for the transfer of heat from the flue gas passing on one side to said inflow of air passing on another side for a preheating of the air by virtue of rotation of the heat exchanger, wherein the heat exchange relationship between the inflow of air and the flue gas is sufficient to reduce the temperature of the flue gas from a transfer of heat therefrom to the inflow of air for an enhanced thermal efficiency of the heat generator, and with the temperature of the flue gas being reduced by said transfer of heat by said heat exchanger to a level where at least one of said pollutants condenses out from the flue gas within the heat exchanger and wherein the ratio of the heat capacity of air, $H_a$, to the heat capacity of the rotary heat exchanger, $H_r$, is greater than about 0.05 at full load;

during said heat transfer directing a stream of wash liquid at the axial end of the rotary heat exchanger where the flue gas enters and the air exits to remove particles and pollutants from heat exchange elements of the heat exchanger, with the amount of washing liquid being selected so that the ratio of the heat capacity of air, $H_a$, to the heat capacity of the liquid, $H_L$, is greater than about 0.2 at full load;

during said heat transfer applying a stream of neutralizing liquid at previously wash liquid treated surfaces of the rotary heat exchanger and which previously wash liquid treated surfaces are at least almost essentially dried to form a dry layer of neutralizing material on the surfaces of the rotary heat exchanger after evaporation of the neutralizing liquid; and during said heat transfer moving the streams of wash and neutralizing liquids along a zone oriented to rinse the entire rotary heat exchanger as this is rotated past the streams of liquid.

53. The method as claimed in claim 52 wherein the ratio $H_a/H_r$ is selected to be greater than about 0.3 and the ratio of $H_a/H_L$ is selected to be greater than about 2.

54. The method as claimed in claim 53 wherein the ratio $H_a/H_r$ is selected to be greater than about 0.85 and the ratio of $H_a/H_L$ is selected to be greater than about 5.

55. The method as claimed in claim 54 and further comprising the step of rotating the heat exchanger at a speed selected sufficiently low to enable substantial drainage of liquid from wetted heat exchange elements prior to their reentry into the air flow side of the rotary heat exchanger, for an enhancement of heat exchange efficiency during exposure to said liquid stream.

56. A method for improving the operation of a heat generator wherein an inflow of air is used and a hot gas is generated which exhausts as a flue gas at an elevated temperature and contains particulates and gaseous pollutants, comprising the steps of:

passing the flue gas and the inflow of air into axial ends of a rotary heat exchanger having a rotor for the transfer of heat from the flue gas passing on one side to said inflow of air passing on another side for a preheating of the air by virtue of rotation of the heat exchanger, wherein the heat exchange relationship between the inflow of air and the flue gas is sufficient to reduce the temperature of the flue gas from a transfer of heat therefrom to the inflow of air for an enhanced thermal efficiency of the heat generator, and with the temperature of the flue gas being reduced by said transfer of heat by said heat exchanger to a level where at least one of said pollutants condenses out from the flue gas within the heat exchanger;

during said heat transfer directing a first localized stream of wash liquid and a neutralizing material at one axial end of the rotary heat exchanger where the flue gas enters and the air exits to remove particles and pollutants from heat exchange elements of the heat exchanger;

during said heat transfer directing a second localized stream of wash liquid at the other axial end of the rotary heat exchanger where the flue gas exits and the air enters to remove particles and pollutants from heat exchange elements of the heat exchanger, said second stream of wash liquid being in substantial alignment with the first localized stream of wash liquid so as to limit the area of wetted surfaces of the rotary heat exchanger;

during said heat transfer moving the first and second streams of wash liquid along a zone oriented to rinse the entire rotary heat exchanger as this is rotated past the stream of wash liquid; and rotating the heat exchanger at a speed selected sufficiently low to enable substantial drainage of liquid from wetted heat exchange elements prior to their reentry into the air flow side of the rotary heat exchanger, for an enhancement of heat exchange efficiency during exposure to said liquid stream.

57. The method as claimed in claim 56 and further comprising during said heat transfer the steps of:

applying to said rotary heat exchanger along said zone and to said one axial side of the rotor previously washed by the stream of washing liquid a first stream of neutralizing material in an amount generally sufficient to establish a dry neutralizing layer for protection against acid condensed from the flue gas within the heat exchanger;

applying a second stream of neutralizing material to said other side of the rotor and in alignment with the first stream of neutralizing material and in an amount sufficient to establish a dry neutralizing layer for protection against acid condensed from the flue gas within the heat exchanger; and moving the first and second streams of neutralizing material along said zone.

58. The method as claimed in claim 56 and further including during said heat transfer the step of:

pressurizing a plenum surrounding the rotor to a gas pressure level sufficient to suppress the entry into said plenum of gaseous and condensed pollutants from the side in which said flue gas passes.

59. The method as claimed in claim 58 wherein the pressurizing step includes the step of pressurizing the plenum to a gas pressure in the range from about one to about several inches of water above the highest flue gas pressure in the rotor.

60. The method as claimed in claim 58 wherein the pressurizing step comprises the step of:

applying a flow of air from the hot side of the rotor to the plenum in an amount sufficient to obtain said plenum gas pressure.

61. A rotary air preheater for improving the efficiency of a heat generator wherein an inflow of air is used and a hot gas is generated which exhausts as a flue gas at an elevated temperature and contains particulates and gaseous pollutants comprising:

a rotary air preheater having a rotor with a plurality of heat-exchange elements, said rotor being mounted for rotation so as to move the heat-exchange elements in rotational sequence from an air side where the inflow of air passes to a flue gas side where the flue gas passes for a preheating of the air, said rotary air preheater being selected so that the heat exchange relationship between the inflow of air and the flue gas is sufficient to reduce the temperature of the flue gas from a transfer of heat therefrom to the inflow of air for an enhanced thermal efficiency of the heat generator, and with the temperature of the flue gas being reduced by said transfer of heat by the heat exchange elements to a level where at least one of said pollutant condenses out from the flue gas within the heat exchanger;

means for directing a localized stream of wash liquid at the axial end of the rotor where the flue gas enters and the air exits;

means for directing a localized stream of neutralizing material at previously wash liquid treated surfaces of the rotary heat exchanger to form a dry layer of neutralizing material on the surfaces of the rotary heat exchanger after evaporation of the liquid;

means for moving the streams of wash liquid and neutralizing material along a zone located at said latter axial end and oriented to rinse the rotor and coat it with neutralizing material as the rotor is rotated past the stream of wash liquid.

62. The rotary air preheater as claimed in claim 61 wherein said heat exchange elements extend substantially in an uninterrupted manner from the one axial end to the other axial end of the rotor.

63. The rotary air preheater as claimed in claim 62 wherein the neutralizing flow directing means includes a spray nozzle which is mounted at a predetermined radial distance from the stream of wash liquid.

64. In a method of operating a heat generator in which a fuel is burned with an inflow of air to generate a hot combustion gas which, after a transfer of heat therefrom, exhausts as a flue gas at an elevated temperature and contains particulates and gaseous pollutants, wherein the flue gas and the inflow of air are passed through a heat exchanger for the transfer of heat from the flue gas to said inflow of air for a preheating thereof, wherein the inflow of air is sufficient to reduce the temperature of the flue gas from a transfer of heat therefrom to the inflow of air for an enhanced thermal efficiency of the heat generator, with the temperature of the flue gas being reduced by said transfer of heat by said heat exchanger to a level where at least one of said gaseous pollutants condenses out from the flue gas within the heat exchanger, and wherein a wash liquid containing a neutralizing material is applied to the heat exchanger to remove particulates and protect the heat exchanger from condensed pollutants, the improvement comprising the steps of:

transferring sufficient heat from the flue gas to the inflow of air to lower the temperature of the flue gas as it exits from the heat exchanger in the range where the flue gas is at water saturation; and passing said water saturated flue gas into a wet scrubber substantially without further quenching of the flue gas.

65. The method as claimed in claim 64 wherein the heat exchanger is a rotary heat exchanger.

66. The method as claimed in claim 65 wherein the exit temperature of the flue gas from the rotary heat exchanger is sufficiently low to avoid a dry/wet interface downstream from the rotary heat exchanger.

* * * * *